(No Model.)
W. D. PATTERSON.
TELEMETER.
No. 279,273. Patented June 12, 1883.
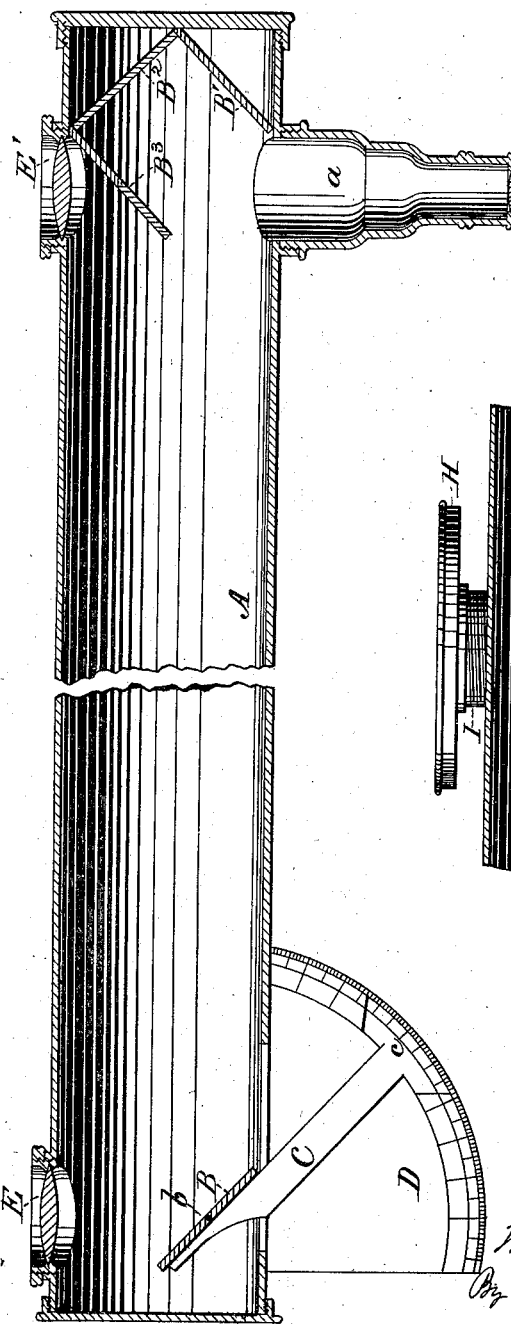

UNITED STATES PATENT OFFICE.

WILLIAM D. PATTERSON, OF SAN FRANCISCO, CALIFORNIA.

TELEMETER.

SPECIFICATION forming part of Letters Patent No. 279,273, dated June 12, 1883.

Application filed March 6, 1883. (No model.)

*To all whom it may concern:*

Be it known that I, WILLIAM D. PATTERSON, of the city and county of San Francisco, State of California, have invented an Improved Telemeter; and I hereby declare the following to be a full, clear, and exact description thereof.

My invention relates to a new and useful telemeter; and it consists in a tube having a means at one end for observing the direct and reflected ray of light from the object, and a means at the other end for causing the reflected ray to coincide with the direct ray, and for reading the angle of the reflected ray, whereby, said angle, the base, and the right angle of the direct ray with the line of collimation in the tube being known, the sine of the angle of the reflected ray may be readily computed and the distance of the object ascertained.

The object of my invention is to ascertain the linear distance to any given object, and to provide for this purpose a simple and effective instrument, as will hereinafter particularly appear, reference being made to the accompanying drawings, in which—

Figure 1 is a horizontal longitudinal section of my telemeter. Fig. 2 is a vertical longitudinal section, showing screw-flanges I and G on the tube A.

A is a tube, having in one end a silvered reflector, B, adapted to change its inclination on pivot $b$.

C is an arm extending through a slot in the tube, and secured to the back of the reflector, whereby said reflector may be moved. This arm carries a vernier, $c$, adapted to travel over a graduated arc, D, divided to read angles to 5", or thereabout.

In the tube A, opposite the reflector, is an object-glass, E. In the other end of the tube A is a reflector, B', and another, B², and a third, B³, all stationary and set at angles of forty-five degrees in the tube, but at right angles with each other. The one marked B³ is but one-half silvered, its upper portion being transparent. In front of this, in the tube, is an object-glass, E', and behind it, in the tube, is inserted a small telescope, $a$, the line of collimation of which is at right angles with the line of collimation of the tube A.

Upon the center of the tube A is formed a screw-flange, G, for the reception of any suitable form of stand or tripod. On top is formed a similar screw-flange, I, upon which is screwed a compass, H.

The use of this telemeter is as follows: It is so placed that the line of collimation through the small telescope and the object-glass E' shall be in direct line with an object, the ray of light from which thus forms a right angle with the line of collimation of the tube A. This direct ray is observed through the half-silvered glass B³ and the small telescope $a$. A ray of light from the said object before observed, entering object-glass E, is caught on the pivoted reflector B. From this it is reflected through the length of the tube to stationary reflector B', thence to reflector B² and to the silvered portion of B³, from whence it is thrown down to the eye at the small telescope. Now, on account of the parallax caused by the length of the tube A as a base, this ray of reflected light will not be parallel with the direct ray of light from said object observed through the object-glass E', the transparent portion of the reflector B³, and the small telescope $a$. The arm C, traveling on the graduated arc, is now moved to change the inclination of the reflector B until the two rays of light from said object coincide in the one-half-silvered glass B³ and form one image. The vernier $c$ indicates on the graduated arc D the true angle at which the ray strikes the reflector B. This angle, the length of the tube A as a base, and the right angle formed by the direct ray with the line of collimation of tube A being known, the distance of the object may be readily calculated. By the aid of the compass H accurate bearings may be taken.

A printed scale of distances corresponding to observed angle may accompany the instrument.

Having thus described my invention, what I claim as new, and desire to secure by Letters Patent, is—

1. In a telemeter, the tube A, having an object-glass at each end, and a small telescope, $a$, whose collimated line is at right angles with the collimated line of said tube, and adapted to permit observation in a direct line through one of the object-glasses, in combination with a swinging mirror or reflector within the tube A in line with the other object-glass, a means for moving and reading the inclination of said mirror, and a system of reflectors in the other end of the tube to reflect the ray of light from the swinging mirror to coincide with the direct ray, substantially as herein described.

2. In a telemeter, the tube A, having an object-glass at each end, and a small telescope whose line of collimation is at right angles with the collimated line of tube A and in line with the object-glass at one end, in combination with the reflectors B' B² and the half-silvered reflector or glass B³, arranged, as shown, to transmit the direct ray to the eye at the small telescope, the swinging mirror or reflector B at the other end of the tube A, adapted to receive a ray through the object-glass at that end, a means for moving or changing the inclination of said reflector to cause its ray to coincide with the direct ray at the other end, and a means for reading the inclination of mirror B, substantially as herein described.

3. A telemeter consisting of the tube A, having object-glasses E E', the small telescope $a$, the reflectors B' B², and half-silvered glass B³, the mirror or reflector B, mounted on pivots $b$ in the other end of the tube A, and the means for inclining and reading the inclination of said mirror, consisting of the arm C, the vernier $c$, and the graduated arc D, all arranged and operating substantially as herein described.

In witness whereof I hereunto set my hand.

WILLIAM D. PATTERSON.

Witnesses:
 WM. F. BOOTH,
 J. H. BLOOD.